United States Patent [19]
Fawcett et al.

[11] 3,938,337
[45] Feb. 17, 1976

[54] APPARATUS FOR CONVERTING ONE FORM OF ENERGY INTO ANOTHER FORM OF ENERGY

[75] Inventors: Sherwood L. Fawcett, Columbus; James N. Anno, Cincinnati, both of Ohio

[73] Assignee: Battelle Development Corporation, Columbus, Ohio

[22] Filed: Jan. 17, 1975

[21] Appl. No.: 541,788

[52] U.S. Cl. .......................... 60/682; 60/721; 290/2
[51] Int. Cl.² .......................................... F01K 25/02
[58] Field of Search ............. 60/643, 650, 682, 645, 60/345, 721; 290/2

[56] References Cited
UNITED STATES PATENTS

| | | | |
|---|---|---|---|
| 3,563,027 | 2/1971 | Greenberger | 60/643 |
| 3,616,645 | 11/1971 | Van Der Voort | 60/682 |
| 3,698,184 | 10/1972 | Barrett | 60/650 |
| 3,859,789 | 1/1975 | Fawcett et al. | 60/325 |

Primary Examiner—Martin P. Schwadron
Assistant Examiner—H. Burks, Sr.
Attorney, Agent, or Firm—Brown, Murray, Flick & Peckham

[57] ABSTRACT

Improvements in apparatus for converting one form of energy into another form with the use of an essentially closed, continuous loop passageway containing a plurality of freely movable, unrestrained bodies. Force generated by expansion of a gas is applied to successive bodies in one region of the passageway to propel them around the passageway in one direction. At another point in the passageway, at least a portion of the kinetic energy of the propelled bodies is converted into another form of energy. Each body, before being propelled around the passageway, enters a compressor section where it compresses the gas in the passageway, the compressed gas being bled off through a check valve where energy is added to it before it is used to propel a body around the passageway in the expander section which immediately follows the thrustor section. The invention is characterized by the addition of conduits connected to the compressor and thrustor sections to regulate the pressures therein and prevent noisy operation, wasted kinetic energy and the possibility of having bodies move backwards from the thrustor section into the compressor section.

8 Claims, 1 Drawing Figure

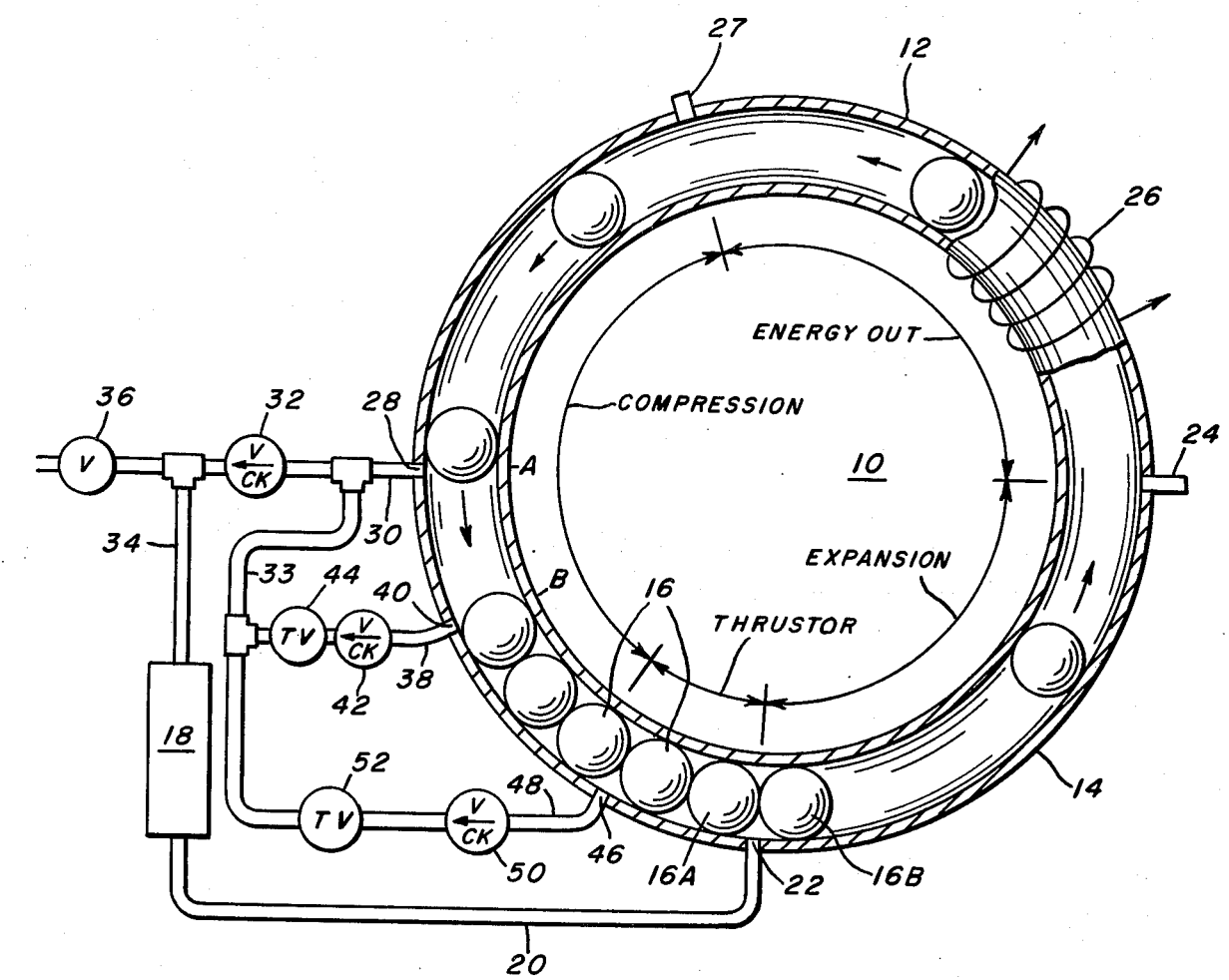

3,938,337

APPARATUS FOR CONVERTING ONE FORM OF ENERGY INTO ANOTHER FORM OF ENERGY

BACKGROUND OF THE INVENTION

In copending application Ser. No. 323,770, filed Jan. 15, 1973 now U.S. Pat. No. 3,859,789, a system is described for converting one type of energy into another type by means of a closed loop passageway containing a plurality of freely movable, mechanically unrestrained pistons, meaning that the pistons are not coupled to a mechanical element but can be propelled around the loop in much the same manner as a projectile. Successive ones of the pistons, preferably spheres having diameters slightly less than that of a tubular passageway through which they travel, are propelled in one direction around the passageway by application of a suitable force applied in a thrustor region of the passageway.

In one embodiment of the invention shown in that application, acceleration of the pistons is effected by means of an expanding fluid medium supplied externally to the closed loop passageway. After the pistons are thus accelerated, they pass through a second region where the kinetic energy of the traveling pistons is converted into another form of energy. This may be accomplished, for example, by forming the pistons from magnetically permeable material and by passing them through the magnetic field of a linear generator which converts the energy of the moving pistons into electrical energy. Alternatively, the kinetic energy of the moving pistons can be used to compress a gas or it can be converted into mechanical motion, for example, by causing successive ones of the pistons to strike radiallyextending blades on a rotatable paddle wheel.

Assuming that expansion of a gas is used to propel the pistons, they pass through a compressor region where the gas between them is compressed preparatory to a succeeding cycle of operation. This compressed gas from the compressor region is fed through a check valve to an external heater where energy in the form of heat is added to the gas, causing it to expand. The expanded gas is then used in a thrustor section following the compressor section to propel successive ones of the pistons around the closed loop passageway.

It has been found that when a piston enters the compressor section of the closed loop passageway with excessive kinetic energy, it may still have considerable kinetic energy by the time it passes the compressor outlet port when gas is lead through the aforesaid check valve to the external heater. Without the present invention, this situation is undesirable for two reasons. First, the residual kinetic energy of the piston is wasted and does not contribute to the compressor output. Secondly, a piston having excessive kinetic energy may strike other bodies in the compressor section with excessive velocity, thereby causing erratic and noisy operation. Furthermore, certain situations may arise wherein the pressure within the thrustor section exceeds that in the compressor section, meaning that pistons will tend to move from the thrustor section back into the compressor section, interfering with the compressor operation.

SUMMARY OF THE INVENTION

In accordance with the present invention, the problem of sporadic and noisy operation due to excessive kinetic energy of a propelled piston entering the compressor section is eliminated with the use of a conduit connected to the compressor section downstream of the compressor gas output leading through a check valve back to the compressor outlet. The other end of the aforesaid conduit is connected to the compressor output itself such that the pressures on opposite sides of a piston entering the thrustor section tend to equalize. In this manner, a shock absorbing effect is achieved after the piston passes the normal compressor output conduit, whereby it is slowly down gradually without slamming into other bodies in the closed passageway with excessive velocity or traveling backwardly. At the same time, the adiabatic compression energy expanded into the gas, by virtue of the shock absorber action, is shunted back to the compressor section such that it is not wasted.

Additionally, a conduit is connected to the thrustor section leading back to the compressor output conduit with a check valve therein so as to maintain the pressure in the thrustor section always less than or equal to the compressor output pressure. In this way, there is always a force to "snug" the pistons together in the thrustor region and prevent the bodies from moving from the thrustor section back into the compressor section.

In its broadest aspects, the invention contemplates means for regulating the pressure in the continuous passageway between the compressor section outlet and the thrustor section inlet to prevent noisy operation and the possibility of malfunctioning due to backward travel of the pistons as explained above.

The above and other objects and features of the invention will become apparent from the following detailed description taken in connection with the accompanying single FIGURE drawing which forms a part of this specification.

With reference now to the drawings, there is shown an engine 10 comprising a torus or closed loop passageway 12. The passageway 12 is defined by a metal housing 14 having interior walls which are preferably smooth. Disposed within the passageway 12 is a plurality of solid bodies or pistons 16 shown as spheroids. The tolerances or clearances between the surfaces of spheroids 16 and the inside walls of the passageway 12 are such as to permit the spheroids to move freely along the passageway 12. However, fluid flow past the spheroids within the passageway is substantially prevented. In the embodiment of the invention shown in the drawing, the closed loop passageway 12 has a circular cross section (not shown in the drawing), but with other shaped pistons, other cross sections may be utilized including elliptical or polygonal cross sections with suitably shaped pistons.

In the particular embodiment of the invention shown herein, the closed loop passageway is divided into a compressor section, a thrustor section, an expander section and an energy out section. In the expander section, compressed air from a gas heater 18 is fed via conduit 20 to an inlet port 22. As the compressed gas enters the port 22, it generates a force between pistons 16A and 16B, for example, which propels piston 16B around the passageway 12 in a counterclockwise direction. The weight of the pistons 16 in the thrustor and compressor sections of the passageway 12 prevents backward movement of the remaining spheres in the thrustor section. This, of course, assumes that the passageway 12 lies in a vertical plane with the axis of the passageway being horizontal. However, if the passageway 12 should lie in a horizontal plane, the spheres in the thrustor section will not be acted upon by gravity; and it is usually necessary to provide a latch, such as that shown in copending application Ser. No. 323,770, to prevent backward movement of the spheres in the thrustor section.

After each successive piston is propelled forwardly in a counterclockwise direction, the gas behind it expands until a port 24 is reached where the heated gas is exhausted to the atmosphere. Thereafter, the piston can travel through an energized electromagnetic coil 26 where resistance is presented to its travel by virtue of its cutting magnetic lines of force. This implies, of course, that the pistons 16 are formed from magnetically permeable material and that the walls of the passageway 12 are formed from a non-magnetically permeable material such as aluminum or the like. Thus, at least part of the kinetic energy of the propelled piston 16 is absorbed by cutting lines of flux produced by the coil 26. The resulting electrical pulse may then be applied to external electrical utilization apparatus, not shown, whereby the kinetic energy of the moving pistons is converted into electrical energy. The kinetic energy of the moving pistons can also be converted to other types of energy, such as a compressed gas as will be hereinafter explained.

After each successive propelled piston passes through the coil 26 in the embodiment shown in the drawing, it travels to a port 27 where air is sucked into the passageway 12. At this point, the compression portion of the cycle begins with each piston or sphere moving to a port 28 where the compressed air is exhausted through a conduit 30 and check valve 32 to conduit 34, and thence the heater 18.

In the operation of the device shown in the drawing, valve 36 is initially opened and compressed gas from a compressor or other convenient source, not shown, is provided to the heater 18 and conduit 20 such that it passes through the port 22 into passageway 12 to propel successive ones of the spheres 16 forwardly. As each sphere travels around the passageway 12, it reaches the compressor section where the gas is compressed ahead of the piston. This compressed gas passes through conduit 30 and through check valve 32 to the heater 18 where it is heated and expanded preparatory to its being used to propel successive ones of the pistons around the passagewy.

After the operation of the device is initiated in the manner described above, the valve 36 is closed and energy is added to the gas via compression by the pistons in the compressor section and heating in the heater 18.

As was explained above, it sometimes happens that a piston enters the compressor section with excessive kinetic energy and may still have considerable kinetic energy by the time it passes the compressor outlet port 28. Without additional means, this situation is undesirable since the residual kinetic energy of the piston after it passes the port 28 will be wasted in attempting to compress air between it and the pistons waiting to enter the thrustor section. Furthermore, the piston, in compressing air after passing port 28, may actually stop and bounce backwardly because of expansion of gas ahead of it. In this case, the backwardly-traveling piston may strike a following piston, thereby causing erratic and noisy operation. In order to prevent this condition, a conduit 38 is connected to the compressor section via port 40 downstream of the compressor outlet port 28.

The conduit 38, in turn, is connected through a check valve 42 and throttle valve 44 to conduit 33 which leads back to the compressor output port 28. In this manner, after the piston passes the compressor outlet port 28, further compression can occur between points A and B, more or less gradually slowing down the piston to the desired speed value to enter the thrustor section. The effect is similar to that of a shock absorber. At the same time, the interconnection between ports 28 and 40 tends to equalize the pressure on opposite sides of a decelerating piston, reducing the possibility of its bouncing backwardly. Furthermore, the gas compressed between points A and B is fed through the check valve 42, throttle valve 44 and check valve 32 back to heater 18 such that the kinetic energy of the piston in slowing down between points A and B is not wasted. This not only reduces shock but makes the compressor operation more efficient and permits a degree of latitude in variation of kinetic energy of the pistons entering the compressor section.

Also, as was explained above, it sometimes happens that the pressure within the thrustor section will be greater than that in the compressor section, possibly causing pistons to move backwardly from the thrustor section to the compressor section. Accordingly, a feature of the invention is to provide a second port 46 connected through conduit 48, check valve 50 and throttle valve 52 to conduit 33 and back to port 28. In this manner, and by virtue of the throttle valve 52, the pressure in the thrustor section is always less than or equal to the compressor output pressure at port 28. Thus, there is always a force to "snug" the pistons together in the thrustor section and prevent backward movement of the pistons into the compressor section. The throttle valves 44 and 52 insure that the rate of pressure equalization between points A and B and in the thrustor section insures smooth piston travel regardless of any other circumstances existing.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. Apparatus for converting a first form of energy to a second form of energy comprising:
   a. a continuous loop passageway having a compressor section followed by a thrustor section,
   b. a plurality of freely movable, unrestrained pistons disposed within said passageway for movement therearound,
   c. a first conduit means connected to said compressor section for leading out compressed gas from said passageway as successive ones of the pistons move into the compressor section,
   d. means for adding energy to the gas fed from the compressor section,
   e. second conduit means for feeding gas, after the addition of energy thereto, back to the expander section to propel successive ones of said bodies around the passageway by expansion of the gas, and
   f. means for regulating the pressure in said passageway between the connections thereto of said first and second conduit means.

2. The apparatus of claim 1 including check valve means between said means for adding energy and said first conduit means.

3. The apparatus of claim 2 wherein said means for regulating the pressure in said passageway between the connections thereto of said first and second conduit means comprises a third conduit means connected to said compressor section downstream of said first conduit means, and check valve means connecting said third conduit means to the first conduit means whereby gas compressed between said first and third conduit means is bled through said check valve means back to said means for adding energy.

4. The apparatus of claim 3 including a pressure control valve interposed between said last-mentioned check valve means and the inlet of said means for adding energy.

5. The apparatus of claim 2 wherein said means for regulating the pressure in said passageway between the connections thereto of said first and second conduit means comprises conduit means connected to said thrustor section, and means including check valve means connecting said last-mentioned conduit means to the first conduit means whereby the pressure in said thrustor section will be equal to or less than that in the compressor section.

6. The apparatus of claim 5 including a throttle valve interposed between said last-mentioned check valve means and the inlet of said means for adding energy.

7. The apparatus of claim 1 wherein said means for regulating the pressure in said passageway between the connections thereto of said first and second conduit means comprises third conduit means connected to the compressor section of said passageway downstream of said first conduit means, means including first check valve means connecting said third conduit means to said first conduit means, fourth conduit means connected to the thrustor section of said passageway, and means including second check valve means connecting said fourth conduit means to said first conduit means, the arrangement being such that the pressure within said thrustor section will be maintained equal to or less than that in the compressor section and excessive kinetic energy of bodies entering the compressor section will be absorbed by compression of gas between said first and third conduit means with the compressed gas being bled back to said means for adding energy through the first conduit means.

8. The apparatus of claim 7 including third check valve means connecting said first, third and fourth conduit means to the inlet of said means for adding energy.

* * * * *